(12) United States Patent
Prichard

(10) Patent No.: US 11,986,974 B2
(45) Date of Patent: May 21, 2024

(54) ADDITIVE MANUFACTURING TECHNIQUES AND APPLICATIONS THEREOF

(71) Applicant: Kennametal Inc., Latrobe, PA (US)

(72) Inventor: Paul D. Prichard, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 843 days.

(21) Appl. No.: 16/828,657

(22) Filed: Mar. 24, 2020

(65) Prior Publication Data

US 2020/0307018 A1  Oct. 1, 2020

Related U.S. Application Data

(60) Provisional application No. 62/823,149, filed on Mar. 25, 2019.

(51) Int. Cl.
| | | |
|---|---|---|
| B28B 1/00 | (2006.01) | |
| B22F 7/02 | (2006.01) | |
| B22F 10/28 | (2021.01) | |
| B22F 10/38 | (2021.01) | |
| B23K 15/00 | (2006.01) | |

(Continued)

(52) U.S. Cl.
CPC ............... B28B 1/001 (2013.01); B22F 7/02 (2013.01); B22F 10/28 (2021.01); B22F 10/38 (2021.01); B23K 15/0086 (2013.01); B33Y 10/00 (2014.12); B33Y 70/00 (2014.12);
(Continued)

(58) Field of Classification Search
CPC .. B28B 1/001; B22F 7/02; B22F 10/28; B22F 10/38; B22F 10/14; B22F 10/34; B22F 10/64; B22F 10/66; B22F 5/007; B22F 2998/10; B23K 15/0086; B33Y 10/00; B33Y 70/00; Y02P 10/25; B29C 64/153
See application file for complete search history.

(56) References Cited

U.S. PATENT DOCUMENTS

| | | | |
|---|---|---|---|
| 2,884,227 | A | 4/1959 | Hjalsten |
| 3,640,356 | A | 2/1972 | Feenstra |

(Continued)

FOREIGN PATENT DOCUMENTS

| | | |
|---|---|---|
| CN | 2078789 U | 6/1991 |
| CN | 1165907 A | 11/1997 |

(Continued)

OTHER PUBLICATIONS

Apr. 23, 2020 Notice of Allowance U.S. Appl. No. 15/727,307, 7 pages.

(Continued)

*Primary Examiner* — Anthony M Liang
*Assistant Examiner* — Danny N Kang
(74) *Attorney, Agent, or Firm* — Larry R. Meenan

(57) ABSTRACT

In one aspect, a method of making a sintered article comprises providing a composite article comprising a porous exterior printed from a powder composition via one or more additive manufacturing techniques, the porous exterior defining an interior volume and providing a loose powder component in the interior volume. The porous exterior and loose powder component are simultaneously sintered to provide the sintered article comprising a sintered interior and sintered exterior.

22 Claims, 1 Drawing Sheet

(51) Int. Cl.
B33Y 10/00 (2015.01)
B33Y 70/00 (2020.01)
B22F 10/14 (2021.01)
B22F 10/34 (2021.01)
B22F 10/64 (2021.01)
B22F 10/66 (2021.01)

(52) U.S. Cl.
CPC ............... *B22F 10/14* (2021.01); *B22F 10/34* (2021.01); *B22F 10/64* (2021.01); *B22F 10/66* (2021.01)

(56) References Cited

U.S. PATENT DOCUMENTS

| | | |
|---|---|---|
| 4,059,879 A | 11/1977 | Chmura et al. |
| 4,925,490 A | 5/1990 | Nagai et al. |
| 5,336,465 A | 8/1994 | Matsunaga et al. |
| 6,220,117 B1 | 4/2001 | Butcher |
| 6,353,771 B1 | 3/2002 | Southland |
| 6,572,447 B2 | 6/2003 | Veik et al. |
| 7,776,256 B2 | 8/2010 | Smith et al. |
| 7,832,456 B2 | 11/2010 | Calnan et al. |
| 7,832,457 B2 | 11/2010 | Calnan et al. |
| 8,007,714 B2 | 8/2011 | Mirchandani et al. |
| 8,342,268 B2 | 1/2013 | Lockstedt et al. |
| 8,459,380 B2 | 6/2013 | Mirchandani et al. |
| 8,770,324 B2 | 7/2014 | Smith et al. |
| 9,068,408 B2 | 6/2015 | Vempati et al. |
| 9,186,726 B2 | 11/2015 | Keane et al. |
| 9,393,674 B2 | 7/2016 | Keshavan |
| 9,435,211 B2 | 9/2016 | Xu |
| 9,975,182 B2 | 5/2018 | Stoyanov |
| 11,420,273 B2 | 8/2022 | Fang et al. |
| 2002/0023635 A1 | 2/2002 | Veik et al. |
| 2003/0000339 A1 | 1/2003 | Findeisen et al. |
| 2003/0034177 A1 | 2/2003 | Chitwood et al. |
| 2004/0134309 A1 | 7/2004 | Liu |
| 2007/0102199 A1 | 5/2007 | Smith et al. |
| 2007/0277651 A1 | 12/2007 | Calnan et al. |
| 2008/0069854 A1 | 3/2008 | Xiao et al. |
| 2009/0301788 A1 | 12/2009 | Stevens et al. |
| 2009/0301789 A1 | 12/2009 | Smith et al. |
| 2010/0038147 A1 | 2/2010 | Lockstedt et al. |
| 2010/0044115 A1 | 2/2010 | Mirchandani |
| 2010/0193254 A1 | 8/2010 | Lind et al. |
| 2011/0030440 A1 | 2/2011 | Keane et al. |
| 2011/0142707 A1 | 6/2011 | Choe et al. |
| 2011/0256013 A1 | 10/2011 | Yamamoto et al. |
| 2012/0040183 A1 | 2/2012 | Kelkar |
| 2012/0151846 A1 | 6/2012 | Wan |
| 2012/0247840 A1 | 10/2012 | Vempati et al. |
| 2012/0292053 A1 | 11/2012 | Xu et al. |
| 2012/0292063 A1 | 11/2012 | Forster et al. |
| 2013/0048271 A1 | 2/2013 | VanLue |
| 2013/0068539 A1 | 3/2013 | Vempati et al. |
| 2013/0303356 A1 | 11/2013 | Smith et al. |
| 2013/0313403 A1 | 11/2013 | Atkins et al. |
| 2013/0316149 A1 | 11/2013 | Atkins et al. |
| 2013/0320598 A1 | 12/2013 | Atkins et al. |
| 2013/0333950 A1 | 12/2013 | Atkins et al. |
| 2014/0087210 A1 | 3/2014 | Keane et al. |
| 2014/0298728 A1 | 10/2014 | Keshavan |
| 2015/0129316 A1 | 5/2015 | Harrington et al. |
| 2015/0283614 A1 | 10/2015 | Wu et al. |
| 2015/0354284 A1 | 12/2015 | Griffo et al. |
| 2016/0039006 A1 | 2/2016 | Amstutz et al. |
| 2016/0053550 A1 | 2/2016 | Wilson et al. |
| 2016/0067780 A1 | 3/2016 | Zediker |
| 2016/0076342 A1 | 3/2016 | Silva |
| 2016/0082667 A1 | 3/2016 | Donderici |
| 2016/0084083 A1 | 3/2016 | Hice et al. |
| 2016/0088870 A1 | 3/2016 | Langeland |
| 2016/0138343 A1 | 5/2016 | Collins et al. |
| 2016/0138362 A1 | 5/2016 | Dockweiler |
| 2016/0177637 A1 | 6/2016 | Fleckenstein et al. |
| 2016/0185009 A1 | 6/2016 | Keshavan et al. |
| 2016/0201425 A1 | 7/2016 | Walton et al. |
| 2016/0207109 A1 | 7/2016 | Buller et al. |
| 2016/0222798 A1 | 8/2016 | Snyder et al. |
| 2016/0238200 A1 | 8/2016 | Schroeder et al. |
| 2016/0258223 A1 | 9/2016 | Uhlenberg et al. |
| 2016/0258242 A1 | 9/2016 | Hayter et al. |
| 2016/0258298 A1 | 9/2016 | Channel et al. |
| 2016/0288200 A1 | 10/2016 | Xu et al. |
| 2016/0312567 A1 | 10/2016 | Murphree et al. |
| 2016/0325348 A1 | 11/2016 | Ownby et al. |
| 2016/0332236 A1 | 11/2016 | Stoyanov |
| 2016/0375493 A1 | 12/2016 | Stoyanov et al. |
| 2017/0037518 A1 | 2/2017 | Oxford et al. |
| 2017/0050241 A1 | 2/2017 | Thomas et al. |
| 2017/0072465 A1 | 3/2017 | Welch et al. |
| 2017/0072469 A1 | 3/2017 | Maderud et al. |
| 2017/0087622 A1 | 3/2017 | Cook, III et al. |
| 2017/0100771 A1 | 4/2017 | Voglewede et al. |
| 2017/0101835 A1 | 4/2017 | Webster et al. |
| 2017/0101836 A1 | 4/2017 | Webster et al. |
| 2017/0107764 A1 | 4/2017 | Cook, III et al. |
| 2017/0173696 A1 | 6/2017 | Sheinman |
| 2017/0342779 A1 | 11/2017 | Cook, III |
| 2017/0369382 A1 | 12/2017 | Billotte Cabre et al. |
| 2018/0236687 A1 | 8/2018 | Prichard et al. |
| 2018/0250744 A1 | 9/2018 | Symeonidis et al. |
| 2018/0250775 A1* | 9/2018 | Spink .................. B23K 26/034 |
| 2018/0361477 A1 | 12/2018 | Morimoto et al. |
| 2019/0084047 A1 | 3/2019 | Lehto et al. |
| 2019/0168299 A1 | 6/2019 | Prichard et al. |
| 2019/0211424 A1 | 7/2019 | De Flon |
| 2020/0218876 A1 | 7/2020 | Park et al. |
| 2021/0114123 A1 | 4/2021 | Fang et al. |

FOREIGN PATENT DOCUMENTS

| | | |
|---|---|---|
| CN | 1531470 A | 9/2004 |
| CN | 101142416 A | 3/2008 |
| CN | 101148747 A | 3/2008 |
| CN | 101153363 A | 4/2008 |
| CN | 101356340 A | 1/2009 |
| CN | 101588884 A | 11/2009 |
| CN | 201416393 Y | 3/2010 |
| CN | 101721857 A | 6/2010 |
| CN | 102363876 A | 2/2012 |
| CN | 102489707 A | 6/2012 |
| CN | 103060589 A | 4/2013 |
| CN | 103962561 A | 8/2014 |
| CN | 104321501 A | 1/2015 |
| CN | 104588650 A | 5/2015 |
| CN | 104858430 A | 8/2015 |
| CN | 104903029 A | 9/2015 |
| CN | 105648383 A | 6/2016 |
| CN | 105840106 A | 8/2016 |
| CN | 105848812 A | 8/2016 |
| CN | 205805420 U | 12/2016 |
| CN | 106491247 A | 3/2017 |
| CN | 106493371 A | 3/2017 |
| CN | 106780724 | 5/2017 |
| CN | 107107187 A | 8/2017 |
| CN | 107374760 A | 11/2017 |
| CN | 108780724 A | 11/2018 |
| CN | 109865838 A | 6/2019 |
| DE | 102016108507 A1 | 11/2016 |
| EP | 0545718 A2 | 6/1993 |
| EP | 0864661 A1 | 9/1998 |
| EP | 1518622 A1 | 3/2005 |
| EP | 2465960 A1 | 6/2012 |
| EP | 2690196 A1 | 1/2014 |
| EP | 3409801 A1 | 12/2018 |
| JP | H1088311 A | 4/1998 |
| JP | 2002356328 A | 12/2002 |
| JP | 2005171299 A | 6/2005 |
| KR | 20160146729 A | 12/2016 |
| WO | 2006093403 A1 | 9/2006 |
| WO | WO2007127899 A2 | 11/2007 |
| WO | WO2011008439 A2 | 1/2011 |
| WO | WO2011149401 A1 | 12/2011 |

(56) References Cited

FOREIGN PATENT DOCUMENTS

| WO | 2015073081 A1 | 5/2015 |
|---|---|---|
| WO | WO2015162206 A2 | 10/2015 |
| WO | WO2016056934 | 4/2016 |
| WO | WO2016076853 | 5/2016 |
| WO | WO2016085452 | 6/2016 |
| WO | WO2016094704 A1 | 6/2016 |
| WO | WO2016112169 | 7/2016 |
| WO | WO2016148724 A1 | 9/2016 |
| WO | WO2016171711 A1 | 10/2016 |
| WO | WO2016176221 | 11/2016 |
| WO | WO2017011825 | 1/2017 |
| WO | WO2017039619 | 3/2017 |
| WO | WO2017069744 | 4/2017 |

OTHER PUBLICATIONS

Apr. 22, 2022 Notice of Allowance CN Application No. CN201811119848.0, CN109630027A, 7 pages.

May 31, 2022 Notice of Non-Final Rejection (non-US) for KR Application No. KR1020197021387, 6 Pages.

Jul. 26, 2022 Final Office Action U.S. Appl. No. 15/831,779, 27 Pages.

Hashe N.G., et al., "Characterization of WC-(W,V)C-Co Made from Pre-Alloyed (W,V)C," International Journal of Refractory Metals and Hard Materials, Elsevier, Amsterdam, NL, Mar. 1, 2009, vol. 27, No. 2, ISSN 0263-4368, pp. 229-233, DOI:10.1016/j.ijrmhm. 2008.09.020, XP025937878.

Heijink A., et al., "Prosthesis Design and Stress Profile After Hip Resurfacing: A Finite Element Analysis," Journal of Orthopaedic Surgery, Dec. 2008, vol. 16, No. 3, pp. 326-332, Retrieved from URL: https://journals.sagepub.com/doi/pdf/10.1177/230949900801600312.

Kernan B.D., et al., "Three-Dimensional Printing of Tungsten Carbide-10wt% Cobalt Using a Cobalt Oxide Precursor," International Journal of Refractory Metals and Hard Materials, Elsevier, Amsterdam, NL, Jan. 1, 2007, vol. 25, No. 1, 2 pages, DOI:10.1016/j.ijrmhm.2006.02.002, ISSN 0263-4368, XP005719849.

Tan D., et al., "Kinesin-13s form Rings Around Microtubules," The Journal of Cell Biology, Oct. 9, 2006, vol. 175, No. 1, Figure. 4, pp. 25-31.

Aug. 22, 2017 Advisory Action U.S. Appl. No. 15/437,153, 3 Pages.

Aug. 13, 2019 Non-Final Office Action U.S. Appl. No. 15/727,307, 11 pages.

Jan. 16, 2020 Foreign Office Action, Austrian Application No. PCT/US18018553, 5 pages.

Dec. 4, 2020 English translation of Office Action (non-US) Chinese Application No. 201880007874.6, 10 pages.

Mar. 22, 2022 Office Action (non-US) JP Application No. 2019542515, 4 pages.

Mar. 28, 2022 Office Action (non-US) Spain Application No. 201990065, ES2732648, 9 pages.

Apr. 7, 2022 Office Action (non-US) CN Application No. 201880007874.6, CN110199043, 19 pages.

May 31, 2022 Office Action (non-US) KR Application No. KR1020197021387, 6 pages.

Jun. 16, 2022 Office Action (non-US) CN App.No. 109865838A.

Heijink A., et al., "Prosthesis Design and Stress Profile After Hip Resurfacing: A Finite Element Analysis," Journal of Orthopaedic Surgery, Dec. 2008, vol. 16, No. 3, pp. 326-332, URL: https://journals.sagepub.com/doi/pdf/10.1177/230949900801600312.

International Preliminary Report on Patentability for International Application No. PCT/US2018/018553, dated Aug. 29, 2019, 14 Pages.

International Preliminary Report on Patentability for International Application No. PCT/US2020/024495, dated Oct. 7, 2015, 6 Pages.

International Search Report and Written Opinion for International Application No. PCT/US2018/018553, dated May 31, 2018, 15 Pages.

International Search Report and Written Opinion for International Application No. PCT/US2020/024495, dated Jul. 14, 2020 7 Pages.

Yang X., et al., "Effect of Powder Properties on Electron Beam Selective Melting Rapid Prototyping", Rare Metal Materials and Engineering, Abstract, p. 576, pp. 1-31, Sep. 2007.

Wang et al., Direct Selective Laser Sintering of Hard Metal Powders.

Laoui, T. et al., Influence of powder parameters on selective laser sintering of tungsten carbide.

Kelley, III, Andrew, Tungsten Carbide-Cobalt by Three Dimensional Printing.

Davis, E.A., An Introduction to Metal Matrix Composites.

Feb. 21, 2020 Non-Final OA.

Jan. 30, 2020 Final OA.

Dec. 24, 2019 Exam Notice.

Dec. 20, 2019 Final OA.

Oct. 7, 2019 Non-Final OA.

Aug. 22, 2019 Advisory Action.

Aug. 13, 2019 Non-Final OA.

May 6, 2019 Final OA.

Dec. 17, 2018 Non-Final OA.

Jun. 25, 2018 Advisory Action Received.

May 31, 2018 International Search Report Transmitted.

Apr. 4, 2018 Final Office Action.

Nov. 13, 2017 Office action (3 months).

Aug. 22, 2017 Advisory Action (PTOL-303).

Apr. 4, 2017 Final Office Action.

Nov. 28, 2016 Office action (3 months).

Wu et al., "Minimum Compliance Topology Optimization of Shell-Infill Composites for Additive Manufacturing", Computer Methods in Applied Mechanics and Engineering, 2017.

Kruth et al., "Consolidation phenomena in laser and powder-bed based layered manufacturing", CIRP Annals-Manufacturing Technology, 56 (2007), p. 730-759.

Das et al., Producing Metal Parts with Selective Laser Sintering/Hot Isostatic Pressing, JOM, 50 (12) (1998), pp. 17-20.

Clausen et al., "Exploiting Additive Manufacturing Infill in Topology Optimization for Improved Buckling Load", Engineering, 2 (2016), p. 250-257.

Belter et al., "Strengthening of 3D Printed Fused Deposition Manufactured Parts Using the Fill Compositing Technique", PLoS One, 2015.

Dec. 26, 2022 Foreign Office Action Korean Application No. 1020197021387, 11 pages.

Dec. 27, 2022 Foreign Office Action Chinese Application No. CN201811311707.9, 12 pages.

Yun Bai et al., Effect of Particle Size Distribution on Powder Packing and Sintering in Binder.

Productivity enhancement of laser powder bed fusion using.

Fundamentals of Medical Implant Materials.

Fabricating Functional Ti-Alloy.

Comparison of Bone Ingrowth.

Mar. 25, 2021 Office action (3 months) (US Only) US App. No. 20190168299A1.

Feb. 8, 2021 Office Action (non-US) ES App. No. 2732648.

Jan. 27, 2021 Advisory Action (PTOL-303) 1 US App. No. 20180236687A1.

Dec. 4, 2020 Office Action (non-US) CN App. No. 110199043.

Oct. 14, 2020 Final Office Action (US Only) US App. No. 20180236687A1.

Sep. 28, 2020 Advisory Action (PTOL-303) 1 US App. No. 20190084290A1.

Aug. 5, 2020 Final Office Action (US Only) US App. No. 20190168299A1.

Jul. 21, 2020 Final Office Action (US Only) US App. No. 20190084290A1.

Jun. 15, 2020 Office action (3 months) (US Only) US App. No. 20180236687A1.

May 13, 2020 Office Action (non-US) SE App. No. 1950947-0.

Apr. 1, 2020 Search report ES App. No. 2732648.

Mar. 18, 2020 Notice of Allowance US App. No. 20190106941A1.

Mar. 17, 2020 Office action (3 months) (US Only) US App. No. 20190084290A1.

(56) References Cited

OTHER PUBLICATIONS

Feb. 27, 2020 Advisory Action (PTOL-303) 1 US App. No. 20190106941A1.
Jan. 16, 2020 Office Action (non-US) AT App. No. 521303.
Dec. 8, 2021 Advisory Action (PTOL-303) 1 US App. No. 20190168299A1.
Aug. 17, 2021 Final Office Action (US Only) US App. No. 20190168299A1.
Jul. 14, 2020 Search Report International Publication WO App. No. 2020198245.
Holland et al., "Design and characterisation of food grade powders and inks for microstructure control using 3D printing", Journal of Food Engineering, 220, 2018, pp. 12-19, Elsevier Ltd.
Yang et al., "Influence of powder properties on rapid prototyping by electron beam selective melting", Rare Metal Materials and Engineering, Sep. 30, 2007, pp. 574-577, vol. 36, supplement 3.
Yan et al., "3D Printing-Creativity Changes Lives", Xidian University Press, Oct. 31, 2016, p. 1.
Feb. 3, 2022 Non-Final OA—U.S. Appl. No. 15/831,779.
Jan. 18, 2022 Foreign OA—CN App. No. 201811119848.0.
Jan. 6, 2022 Foreign OA—CN App. No. 201880007874.6.
Jan. 5, 2022 Foreign OA—CN App. No. 201811311707.9.
Nov. 16, 2021 Foreign OA—JP App. No. 2019542515.
Nov. 8, 2021 Notice of Allowance—GB App. No. 1909911.8.
Sep. 3, 2021 Office Action (non-US) CN Appl 201880007874.6.
Aug. 31, 2021 Foreign OA—SE App. No. 1950947-0.
Jul. 29, 2021 Foreign OA—DE App. No. 102018122536.9.
Jul. 5, 2021 Foreign OA—ES App. No. P201990065.
Jun. 3, 2021 Exam Notice—GB App. No. 1909911.8.
May 21, 2021 Foreign OA—CN App. No. 201811119848.0.
Mar. 17, 2021 Notice of Allowance—U.S. Appl. No. 16/196,846.
Mar. 15, 2021 Notice of Allowance—U.S. Appl. No. 15/437,153.
Aug. 8, 2018 Notice of Allowance.
Oct. 21, 2020 Advisory Action (PTOL-303) U.S. Appl. No. 15/831,779 3 pages.
Dec. 2, 2022 Foreign Office Action German Application No. 102018128370.9, 12 pages.
Jul. 21, 2023 Foreign Office Action Sweden Application No. 1950947-0, 4 pages.
Jul. 22, 2023 Foreign Office Action Chinese Application No. CN202080021887.6, 14 Pages.
Takahash G., "Sample Preparation for X-ray Fluorescence Analysis," Rigaku Journal, 2015, vol. 31(1), pp. 26 to 30.
Aug. 29, 2023 Foreign Office Action German Application No. DE20181100911 (Pub. No. DE112018000911T5), 8 Pages.
Nov. 29, 2023 Foreign Office Action Korean Application No. KR20237035527, 6 Pages.
Jan. 19, 2023 Foreign Office Action Chinese Application No. CN202080021887.6, 14 Pages.
Feb. 8, 2023 Non-Final Office Action U.S. Appl. No. 15/831,779, 15 Pages.
Sep. 19, 2023 Non-Final Office Action U.S. Appl. No. 15/831,779, 18 Pages.

* cited by examiner

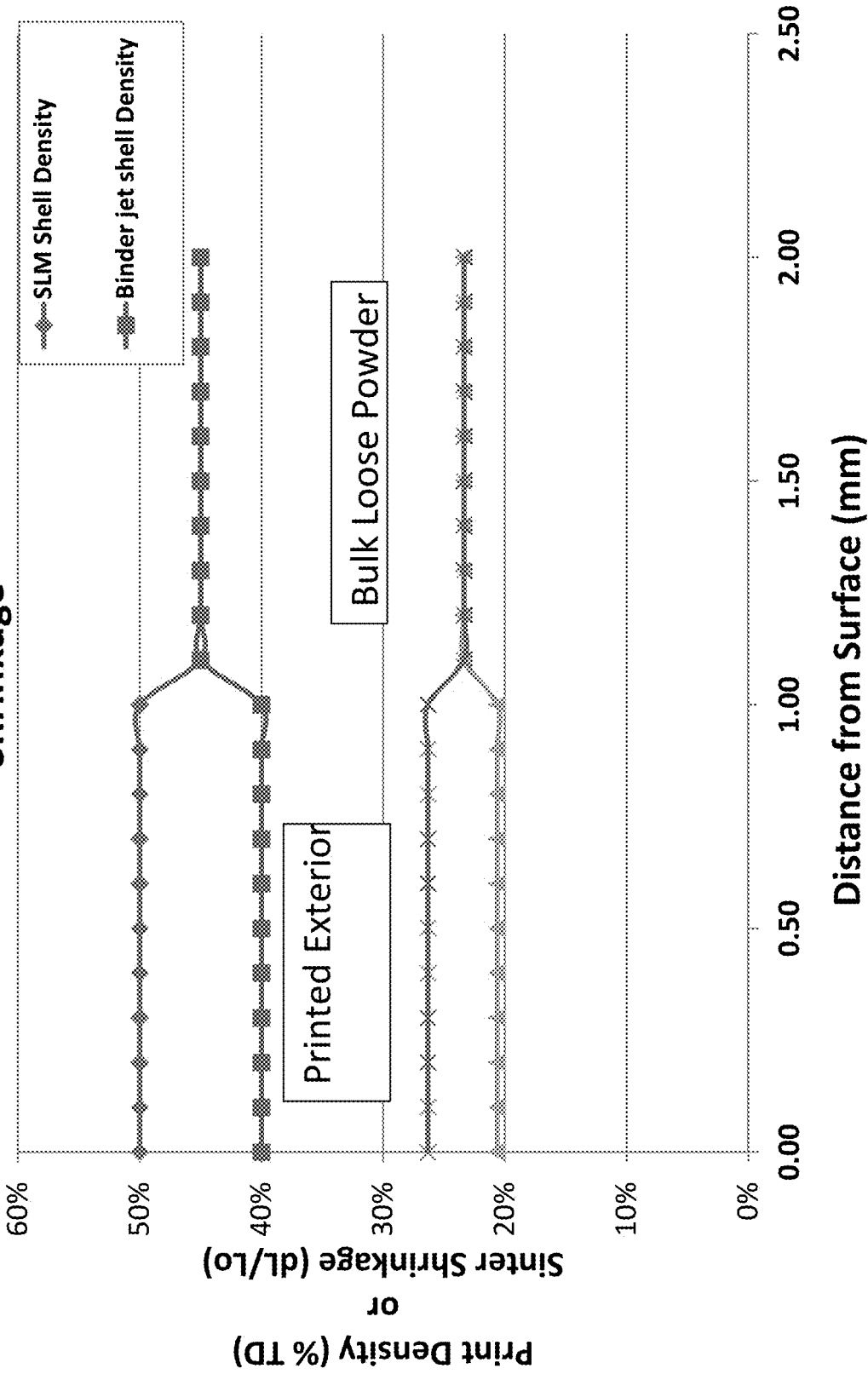

ADDITIVE MANUFACTURING TECHNIQUES AND APPLICATIONS THEREOF

RELATED APPLICATION DATA

The present application claims priority pursuant to 35 U.S.C § 119(e) to U.S. Provisional Patent Application Ser. No. 62/823,149 filed Mar. 25, 2019 which is incorporated herein by reference in its entirety.

FIELD

The present invention relates to additive manufacturing techniques and, in particular, to additive manufacturing techniques providing enhancements to article density before and after sintering.

BACKGROUND

Additive manufacturing generally encompasses processes in which digital 3-dimensional (3D) design data is employed to fabricate an article or component in layers by material deposition and processing. Various techniques have been developed falling under the umbrella of additive manufacturing. Additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of mold lubricants and coolant. Most importantly, additive manufacturing enables significant freedom in article design. Articles having highly complex shapes can be produced without significant expense, allowing the development and evaluation of a series of article designs prior to final design selection.

However, challenges remain with several additive manufacturing techniques. The binder jetting process, for example, requires post-sintering processes to consolidate the printed article to a dense finished product. Final density of the product is a result of several variables, including green density of the printed article. The green density reflects powder packing efficiency and contact proximity of adjacent particles. Smaller particles with higher surface area, higher contact points and short diffusion distances serve to enhance the densification process during sintering. Nevertheless, in powder bed methods, a practical limitation exists of powder size that is both cost effectively manufactured and easily spread into a continuous layer. Moreover, fine particles tend to cake or agglomerate, thereby developing a lower apparent density. In view of these technical considerations, enhancements are required for improving particle interaction and packing efficiency in additive manufacturing techniques.

SUMMARY

In one aspect, methods of making articles are described herein employing additive manufacturing techniques providing enhancements to article density before and after sintering. Briefly, a method of making a sintered article comprises providing a composite article including a porous exterior printed from a powder composition via one or more additive manufacturing techniques, the porous exterior defining an interior volume and providing a loose powder component in the interior volume. The porous exterior and loose powder component are simultaneously sintered to provide the sintered article comprising a sintered interior and sintered exterior. In some embodiments, the porous exterior is printed via a powder bed fusion technique employing radiation or an electron beam to bind particles of the powder composition together. The porous exterior, for example, can have an average density of 50 to 90 percent theoretical density. In another aspect, articles formed according to methods described herein are provided.

These and other embodiments are further described in the following detailed description.

BRIEF DESCRIPTION OF THE DRAWINGS

FIG. 1 illustrates the printed fractional density and sinter shrinkage difference between a 1 mm porous exterior shell produced by a binder jetting process and a 1 mm porous exterior shell produced by a laser powder bed fusion process. Printed fractional density and sintering shrinkage is measured in a direction proceeding from the porous exterior shell to bulk loose powder contained within the shell.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Methods of Making Sintered Articles

In one aspect, a method of making a sintered article comprises providing a composite article comprising a porous exterior printed from a powder composition via one or more additive manufacturing techniques, the porous exterior defining an interior volume, and providing a loose powder component in the interior volume. The porous exterior and loose powder component are simultaneously sintered to provide the sintered article comprising a sintered interior and sintered exterior.

Turning now to specific steps, the porous exterior is printed from a powder composition via one or more additive manufacturing techniques. In some embodiments, the porous exterior is printed via a powder bed fusion technique employing radiation or an electron beam to bind particles of the powder composition together. The porous exterior, for example, can be printed via selective laser melting (SLM), selective laser sintering (SLS), or electron beam melting (EBM). Density of the porous exterior can be selected according to various considerations including, but not limited to, design features and/or size of the composite article, strength requirements for handling the composite article in subsequent operations including sintering, thickness of the exterior, and/or density of the loose powder component in the interior volume. The porous exterior can generally have an average density of 50-90 percent theoretical density. In some embodiments, the porous exterior has an average density ranging from 60-85 percent or from 65-80 percent theoretical density. In some embodiments, density of the composite article exterior is uniform or substantially uniform. In being substantially uniform, density of exterior varies less than 10 percent or less than 5 percent from location to location.

Alternatively, the composite article exterior can comprise one or more density or porosity gradients. In some embodiments, the porous exterior can exhibit a sintering gradient along the exterior thickness. The porous exterior may exhibit less sintering and lower density adjacent to the loose powder component. Sintered density may increase in the porous exterior in a direction moving away from the interior volume. In such embodiments, the green density of the loose powder component and sintered exterior can be more closely matched, thereby reducing cracking and other stresses that can compromise structural integrity of the sintered article.

Structural features of the exterior may also exhibit differing densities. Density gradients of the exterior can have various functions, such as reinforcing areas of the composite article experiencing downstream handling forces, controlling residual stress from sintering shrinkage, accommodating sintering distortions due to tray friction and/or gravitational effects, and creating compressive stresses in the composite article and/or sintered article.

Porosity of the composite article exterior can be interconnected, in some embodiments. In this way, gases are permitted to escape the interior of the composite article during subsequent sintering and/or heat treatment operations. Pore size of the composite exterior can be generally uniform or can vary. Pore size can also be sufficiently small to preclude the loose powder component from passing through the porous exterior.

In some embodiments, the porous exterior forms less than 60 volume percent of the composite article. Volume percent of the composite article formed by the porous exterior can also have a value selected from Table I.

TABLE I

| Composite Article vol. % formed by Porous Exterior |
|---|
| ≤50 |
| ≤40 |
| ≤30 |
| ≤25 |
| ≤20 |
| ≤15 |
| ≤10 |
| 5-50 |
| 5-40 |
| 5-30 |
| 5-20 |
| 10-30 |
| 10-20 |

As described herein, the porous exterior defines an interior volume comprising a loose powder component. In being in the loose state, the powder component is free-flowing and is not restricted. The porous exterior can serve as one or more walls defining an interior of the composite article in which the loose powder component is positioned. Arrangement of exterior walls defining the interior volume is dependent on design parameters specific to the article. For example, if the composite article is a hollow cylinder, a porous inner diameter (ID) wall and porous outer diameter (OD) wall can be formed via one or more additive manufacturing techniques. The porous ID and OD walls define a volume between the walls comprising a loose powder component.

The loose powder component and the powder composition of the porous exterior can have the same or substantially the same composition, in some embodiments. Alternatively, the loose powder component and the powder composition of the porous exterior are of differing compositions. The loose powder component and powder composition of the porous exterior can be independently selected from the group consisting of powder metal and powder alloy. Powder metal can comprise aluminum or any transition metal including, but not limited to, metals of Groups IVB-VIIIB of the Periodic Table. Powder metal can also comprise a transition metal selected from Groups IB and IIB of the Periodic Table. Groups of the Periodic Table described herein are identified according to the CAS designation.

Powder alloy of the porous exterior and/or loose powder component, in some embodiments, comprises cobalt-based alloy, nickel-based alloy or iron-based alloy. Cobalt-based powder alloy is commercially available under the STELLITE®, HAYNES®, and/or TRIBALOY® trade designations. Moreover, nickel-based powder alloy is commercially available under the INCONEL®, HASTELLOY® and/or BALCO® trade designations for some embodiments. Additionally, powder alloy can comprise unweldable superalloys.

Alternatively, the loose powder component and/or powder composition of the porous exterior comprises metal carbide grains. In some embodiments, for example, metal carbide grains comprise tungsten carbide. Metal carbide grains can also include carbides of one or more of niobium, vanadium, tantalum, chromium, zirconium and/or hafnium in addition to tungsten carbide. In other embodiments, the loose powder component and/or powder composition of the porous exterior comprises ceramic particles. Any ceramic particles consistent with the objectives described herein can be used. Suitable ceramics, in some embodiments, comprise metal nitrides, metal carbonitrides, metal carboxynitrides, metal oxides, and/or metal borides.

In some embodiments, metal carbide of the loose powder component and/or exterior powder composition are sintered cemented carbide particles. As detailed further herein, an individual sintered cemented carbide particle comprises multiple metal carbide grains sintered together in conjunction with metallic binder. In the loose condition, the sintered cemented carbide particles can have apparent density of at least 4 $g/cm^3$, in some embodiments. As known to one of skill in the art, apparent density is the mass of a unit volume of powder or particles in the loose condition, usually expressed in $g/cm^3$. In some embodiments, sintered cemented carbide particles have apparent density of at least 7 $g/cm^3$. Apparent density of sintered cemented carbide particles of grade powders described herein can also have values selected from Table II.

TABLE II

| Apparent Density of Sintered Cemented Carbide Particles |
|---|
| >4 $g/cm^3$ |
| >5 $g/cm^3$ |
| ≥6.5 $g/cm^3$ |
| ≥7.5 $g/cm^3$ |
| ≥8 $g/cm^3$ |
| ≥9 $g/cm^3$ |
| 6-11 $g/cm^3$ |
| 7-11 $g/cm^3$ |
| 8-11 $g/cm^3$ |

Apparent density of sintered cemented carbide particles of grade powders can also be less than 6 $g/cm^3$. For example, apparent density of sintered cemented carbide particles can range from 2-6 $g/cm^3$, in some embodiments. Apparent density of sintered cemented particles can be determined according to ASTM B212 Standard Test Method for Apparent Density of Free-Flowing Metal Powders using the Hall Flowmeter Funnel.

In addition to apparent density, sintered cemented carbide particles employed in the composite article can have tap density of at least 5 g/cm³. In some embodiments, sintered cemented carbide particles exhibit tap density having a value selected from Table III.

TABLE III

Tap Density of Sintered Cemented Carbide Particles

| ≥6 g/cm³ |
| ≥7 g/cm³ |
| ≥7.5 g/cm³ |
| ≥8 g/cm³ |
| ≥8.5 g/cm³ |
| ≥9.5 g/cm³ |
| 7-12 g/cm³ |
| 8-12 g/cm³ |
| 9-12 g/cm³ |

Tap density of sintered cemented carbide particles, powder metal and/or powder alloy can be determined according to ASTM B527 Standard Test Method for Tap Density of Metal Powders and Compounds. In some embodiments, the ratio of tap density to apparent density (Hausner ratio) of sintered cemented carbide particles is 1.05 to 1.50. Hausner ratio of sintered cemented carbide particles, in some embodiments is 1.1 to less than 1.50.

In addition to apparent density and tap density, sintered cemented carbide particles can have an average individual particle density of at least 80 percent theoretical density. In some embodiments, average individual particle density of the sintered cemented carbide particles is at least 90 percent or at least 95 percent theoretical density. Sintered cemented carbide particles can exhibit an average individual particle density of 80 to 95 percent theoretical density, in some embodiments. In further embodiments, sintered cemented carbide particles can exhibit an average individual particle density of 90 to 98 percent theoretical density.

As described further herein, the foregoing apparent densities, tap densities and individual particle densities can be achieved through one or several sintering processes administered during formation of the particles. The sintering processes, in some embodiments, do not employ sintering inhibitor(s) to mitigate particle sticking or adhesion. Sintered cemented carbide particle properties described herein can be achieved in the absence of sintering inhibitor(s). In some embodiments, sintered cemented carbide particles are prepared by sintering a grade powder at temperatures of 1100° C. to 1400° C. for 0.5 to 2 hours to provide a sintered compact. The sintered compact is subsequently milled to provide individual sintered cemented carbide particles. Depending on particle morphology and density, the sintered cemented carbide particles can be further heat treated for further densification. Further heat treatment can include plasma densification, such as plasma spheroidization using an RF plasma torch or DC plasma torch. Alternatively, the sintered cemented carbide particles can be re-sintered forming a second compact. The second compact is milled to provide the sintered cemented carbide particles. Further densification treatments can be administered any desired number of times to provide sintered cemented carbide particles desired apparent densities, tap densities and/or individual particle densities. Sintering times and temperatures can be selected according to several considerations including, but not limited to, binder content of the cemented carbide particles, desired sintered particle density and sintering stage. In some embodiments, early sintering stages are conducted at lower temperatures and/or shorter times to facilitate milling the sintered compact. For example, an initial or early stage sintering process may be administered at temperatures below binder liquefaction. Late stage or final sintering processes may achieve higher temperatures, such as temperatures at which liquid phase sintering takes place.

Alternatively, sintered cemented carbide particles have been developed for unrelated applications, such as thermal spray and other cladding applications. In some embodiments, sintered cemented carbide particles commercially available for these unrelated applications may be employed in the loose powder component and/or composite article exterior described herein. Sintered cemented carbide particles developed for thermal spray/cladding applications, for example, are commercially available from Global Tungsten and Powders Corporation under the Powder Perfect trade designation.

Sintered cemented carbide particles can generally have an average size of 1 μm to 100 μm. In some embodiments, sintered cemented carbide particles have an average size selected from Table IV.

TABLE IV

Average Sintered Cemented Carbide Particle Size (μm)

| 5-90 |
| 5-50 |
| 10-75 |
| 10-50 |
| 5-40 |
| 20-40 |
| 0.5-2 |
| 1-5 |
| 1-10 |

Sintered cemented carbide particles can exhibit a Gaussian particle size distribution, in some embodiments. In other embodiments, sintered cemented carbide particles can have a polydisperse, bimodal or multi-modal particle size distribution. In further embodiments, sintered cemented carbide particles can be monodisperse or substantially monodisperse. In being substantially monodisperse, the cemented carbide particles are within ±10 percent or ±5 of the average particle size. In some embodiments, sintered cemented carbide particles are spherical or substantially spherical in shape. Alternatively, sintered cemented carbide particles can be a mixture of irregularly shaped particles with spherical or substantially spherical particles.

Sintered cemented carbide particles comprise one or more metal carbides selected from the group consisting of Group IVB metal carbides, Group VB metal carbides and Group VIB metal carbides. In some embodiments, tungsten carbide is the sole metal carbide of the sintered particles. In other embodiments, one or more Group IVB, Group VB and/or Group VIB metal carbides are combined with tungsten carbide to provide individual sintered particles. For example, chromium carbide, titanium carbide, vanadium carbide, tantalum carbide, niobium carbide, zirconium carbide and/or hafnium carbide and/or solid solutions thereof can be combined with tungsten carbide in sintered particle production. Tungsten carbide can generally be present in the sintered particles in an amount of at least about 80 or 85 weight percent. In some embodiments, Group IVB, VB and/or VIB metal carbides other than tungsten carbide are present in the sintered particles in an amount of 0.1 to 5 weight percent.

Sintered cemented carbide particles comprise metallic binder. Metallic binder of sintered cemented carbide particles can be selected from the group consisting of cobalt, nickel and iron and alloys thereof. In some embodiments, metallic binder is present in the sintered cemented carbide particles in an amount of 0.1 to 35 weight percent. Metallic binder can also be present in the sintered cemented carbide particles in an amount selected from Table V.

TABLE V

| Metallic Binder Content (wt. %) |
| --- |
| 0.1-20 |
| 0.1-10 |
| 0.5-15 |
| 1-10 |
| 3-20 |
| 5-15 |
| 12-15 |
| 10-35 |
| 15-35 |
| 15-25 |

Metallic binder of the sintered cemented carbide particles can also comprise one or more additives, such as noble metal additives. In some embodiments, the metallic binder can comprise an additive selected from the group consisting of platinum, palladium, rhenium, rhodium and ruthenium and alloys thereof. In other embodiments, an additive to the metallic binder can comprise molybdenum, silicon or combinations thereof. Additive can be present in the metallic binder in any amount not inconsistent with the objectives of the present invention. For example, additive(s) can be present in the metallic binder in an amount of 0.1 to 10 weight percent of the sintered cemented carbide particles.

As detailed further herein, portions of the composite article formed by additive manufacturing are largely limited to the porous exterior, wherein the loose powder component of the interior completes the remainder of the composite article. In this way, the loose powder component forms the bulk of the composite article and is spatially free to pack in the most efficient manner. In some embodiments, the loose powder component can be vibrated and/or subjected to mechanical agitation to further enhance packing characteristics and higher green densities. In contrast, the powder composition of the printed exterior exhibits limited freedom of movement due to partial sintering. Accordingly, the exterior exhibits pores and/or other powder packing inefficiencies. As a result of these packing inefficiencies, volume of the composite article occupied by the porous exterior can be minimized. In some embodiments, the porous exterior is limited to a volume percent selected from Table I above. Moreover, the porous exterior can generally exhibit thickness of less than 1.5 mm. Thickness of the porous exterior can be dependent on several considerations including, but not limited to, porosity or density of the porous exterior, overall size of the sintered article, and/or mass of the loose powder component in the interior volume defined by the porous exterior.

The interior volume defined by the porous exterior can have any desired dimensions. Dimensions of the interior volume can be selected according to the particular design of the composite article. In some embodiments, the interior volume has at least one dimension greater than 0.5 mm. In some embodiments, one or more dimensions of the interior volume have a value selected from Table VI.

TABLE VI

| Interior Volume Dimension (mm) |
| --- |
| ≥0.75 |
| ≥1 |
| ≥5 |
| 0.5-1000 |
| 1-1000 |
| 5-5000 |

The interior volume can have any desired shape, including polygonal, spherical, elliptical and any combination of straight and curved surfaces.

As illustrated in FIG. 1, the porous exterior or shell formed by a laser powder bed fusion technique exhibits higher density than the bulk density of the loose powder component, leading to a higher density of the composite article. The opposite is true for the porous exterior formed by a binder jetting process. The binder jetted porous exterior or shell exhibits lower density relative to the bulk density of the loose powder component. In view of this difference, the porous exterior formed via the laser powder bed fusion experiences less sintering shrinkage than the binder jetted exterior, thereby reducing the potential for cracking and/or other structural defects during sintering of the composite article to provide the sintered article. Porous exteriors formed by laser powder bed or electron beam powder bed fusion techniques described herein provide additional advantages of enabling articles of larger dimensions, reducing the volume of the porous exterior, reducing fabrication time of the articles, eliminating the need for structures to support the articles during fabrication and their post-processing removal, and/or eliminating potential contamination effects associated with binder jetted parts.

In some embodiments, the porous exterior is formed around the loose powder component by one or more additive manufacturing techniques described herein. Formation of the exterior around the loose powder component can enable complete production of the composite article at the conclusion of the additive manufacturing process. Strength of the composite article can also be enhanced via one or more printed infill structures residing in the interior volume defined by the porous exterior. Infill structures can have any design consistent with enhancing strength of the composite article. In some embodiments, one or more lattice structures span the interior volume. Specific design and placement of infill structures can be dependent on particular design parameters and strength requirements of the composite article. Infill structures can be uniform or substantially uniform in design and/or placement in the interior volume, in some embodiments. In other embodiments, infill structures can vary in design and/or placement in the interior volume. For example, size of the interior volume may vary over the article requiring variable sizes of infill structural elements. In some embodiments, infill structures can provide sufficient strength to the composite article to permit the porous exterior to match or substantially match density of the interior powder component. Infill structures may also assist in preventing significant shifting or densifying of loose powder, thereby reducing the potential for separation of the porous exterior from the loose powder component during sintering of the composite article.

Infill structures can also exhibit one or more functionalities unrelated to enhancing strength of the composite article. Infill structures, for example, can be one or more conduits of various cross-sectional geometry and/or diameter. One or more conduits in the interior can serve as fluid flow channels in the final sintered article. Fluid flow channels can be employed as flow channels for coolant, including cryogenic coolant. The coolant can be used to cool the sintered article during use of the article in one or more applications, including tooling applications. The coolant can also transferred to one or more articles downstream of the sintered article.

Infill structures can assist in reducing exterior wall thickness and the volume occupied by the porous exterior. Dimensions of the infill structures, including lattice structures, can be selected such that the structures blend into the sintered interior and are, therefore, not discernable from the remainder of the sintered interior formed by the loose powder component. In other embodiments, infill structure(s) remain discernable in the sintered interior of the sintered article. Infill structures can be formed by the additive manufacturing techniques employed in fabrication of the porous exterior.

In some embodiments, the porous exterior is formed by the additive manufacturing process, and the loose powder component is subsequently added to the interior volume defined by the exterior. Once formed, the composite article is subjected to one or more sintering processes to provide the sintered article. The porous exterior and loose powder component are simultaneously sintered or co-sintered, thereby forming a sintered interior and sintered exterior of the article. Sintering times and temperatures can be selected according to several considerations including, but not limited to, compositional identity of the exterior and loose powder component, dimensions of the composite article and desired strength of the sintered article. In some embodiments, the sintered article can be subjected to hot isostatic pressing (HIP). HIP can be administered during or subsequent to the sintering process. Alternatively, desired density of the sintered article can be achieved without a HIP cycle.

The sintered interior and sintered exterior of the article can be continuous with one another. Moreover, a density gradient can exist between the sintered interior and sintered exterior. The sintered interior can exhibit a higher density than the sintered exterior. Alternatively, the sintered exterior can exhibit a higher density than the sintered interior. Methods described herein can further comprise grinding or mechanically removing at least a portion of the sintered exterior. The sintered exterior, in some embodiments, is completely removed from the sintered article leaving behind the sintered interior.

Methods described herein provide additional technical enhancements and advantages. Higher densities of composite articles can lower sintering temperature and obviate the need for HIP cycles to produce article of high density via additive manufacturing techniques. Lower sintering temperatures can inhibit grain growth and provide fine grain sintered articles exhibiting high hardness and high wear resistance.

Moreover, elimination of the binder by employing laser powder bed fusion or electron beam powder bed fusion to form the porous exterior of the composite article can reduce or preclude defects, such as cracking and pore formation, due to gas expansion and gas pocket formation during thermal debindering. This has the added technical effect of enabling thicker articles not previously realized due to internal cracking and voids formed during debindering and/or sintering.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of making a sintered article comprising:
providing a composite article including a porous exterior printed from a powder composition via one or more additive manufacturing techniques employing powder bed fusion with radiation, the porous exterior defining an interior volume;
providing a loose powder component in the interior volume; and
simultaneously sintering the porous exterior and loose powder component to provide the sintered article comprising a sintered interior and sintered exterior, wherein the porous exterior exhibits a higher density than a bulk density of the loose powder component;
the porous exterior forms less than 50% by volume of the composite article; and
the powder composition does not contain a binder.

2. The method of claim 1, wherein the powder bed fusion technique is selective laser sintering or selective laser melting.

3. The method of claim 1, wherein the additive manufacturing technique comprises electron beam melting.

4. The method of claim 1, wherein the porous exterior has an average density of 50 to 90 percent theoretical density.

5. The method of claim 1, wherein the porous exterior has an average density of 60 to 85 percent theoretical density.

6. The method of claim 1, wherein the porous exterior comprises one or more density gradients.

7. The method of claim 1, wherein average density of the sintered article is at least 97 percent theoretical density.

8. The method of claim 1 comprising a density gradient between the sintered interior and sintered exterior.

9. The method of claim 1, wherein the powder composition of the porous exterior and the loose powder component have the same composition.

10. The method of claim 1, wherein the powder composition of the porous exterior and the loose powder component are independently selected from the group consisting of powder metal and powder alloy.

11. The method of claim 10, wherein the powder metal and powder alloy are unweldable.

12. The method of claim 1, wherein the powder composition of the porous exterior and the loose powder component comprise one or more ceramic materials.

13. The method of claim 1, wherein the powder composition of the porous exterior and the loose powder component comprise sintered cemented carbide particles.

14. The method of claim 13, wherein the sintered cemented carbide particles have an apparent density of 6-11 g/cm$^3$.

15. The method of claim 1, wherein the porous exterior has a thickness less than or equal to 0.5 mm.

16. The method of claim 1, wherein the porous exterior is formed around the loose powder component.

17. The method of claim 1, wherein the loose powder component is added to the interior volume.

18. The method of claim 1 further comprising printing one or more lattice structures in the interior volume.

19. The method of claim 18, wherein the lattice structures span the interior volume, contacting sections of the porous exterior.

20. The method of claim 18, wherein the loose powder component surrounds the lattice structures.

21. The method of claim 1 further comprising printing one or more conduits in the interior volume.

22. A method of making a sintered article comprising:
providing a composite article including a porous exterior printed from a powder composition via one or more additive manufacturing techniques employing powder bed fusion with radiation, the porous exterior defining an interior volume;
providing a loose powder component in the interior volume; and
simultaneously sintering the porous exterior and loose powder component to provide the sintered article comprising a sintered interior and sintered exterior, wherein
the porous exterior is printed via binder jetting apparatus, and the composite article comprising the porous exterior and loose powder component is removed from the binder jetting apparatus and placed in a furnace for the simultaneous sintering.

\* \* \* \* \*